United States Patent [19]

Lee

[11] Patent Number: 5,009,471

[45] Date of Patent: Apr. 23, 1991

[54] IMPROVED KALEIDOSCOPE STRUCTURE

[76] Inventor: Vincent K. W. Lee, No. 44, Lane 458, Sheh Chung St., Taipei, Taiwan

[21] Appl. No.: 454,689

[22] Filed: Dec. 21, 1989

[51] Int. Cl.$^5$ .............................................. G02B 23/00
[52] U.S. Cl. ................................................... 350/4.1
[58] Field of Search .................................. 350/4.1, 4.2

[56] References Cited

U.S. PATENT DOCUMENTS 2,484,116 10/1949 Papke ............................ 350/4.2 X
3,100,418 8/1963 Posner ............................... 350/4.2
3,738,036 6/1973 Landsinger et al. ............ 350/4.2 X
4,740,046 4/1988 MacCarthy ......................... 350/4.2

Primary Examiner—Richard A. Wintercorn
Attorney, Agent, or Firm—Ladas & Parry

[57] ABSTRACT

A kaleidoscope structure that uses the irregular patterns produced by the flow of a dripping colored liquid focused and reflected on a multi-angled prism to attain attractive visual effects.

9 Claims, 4 Drawing Sheets

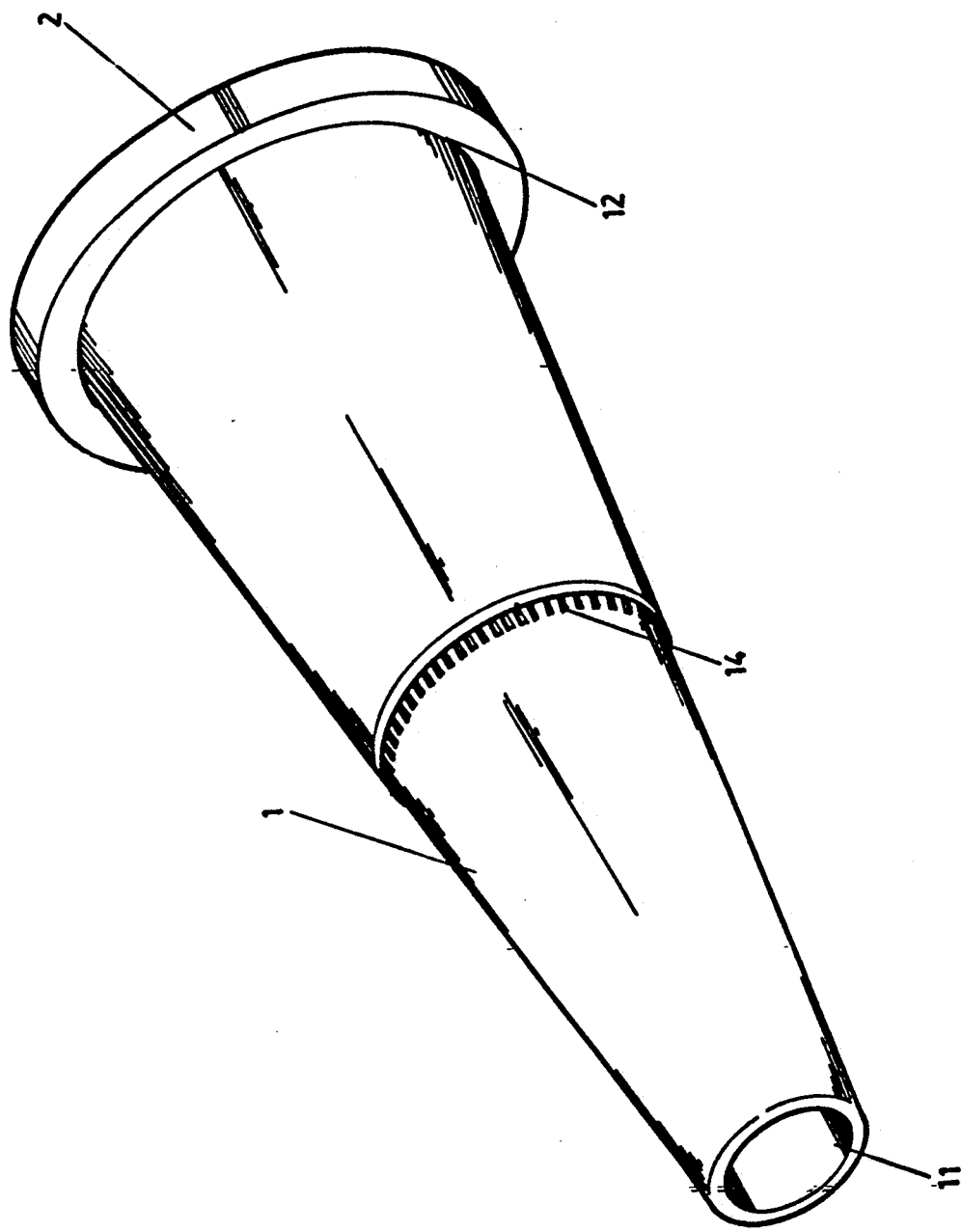

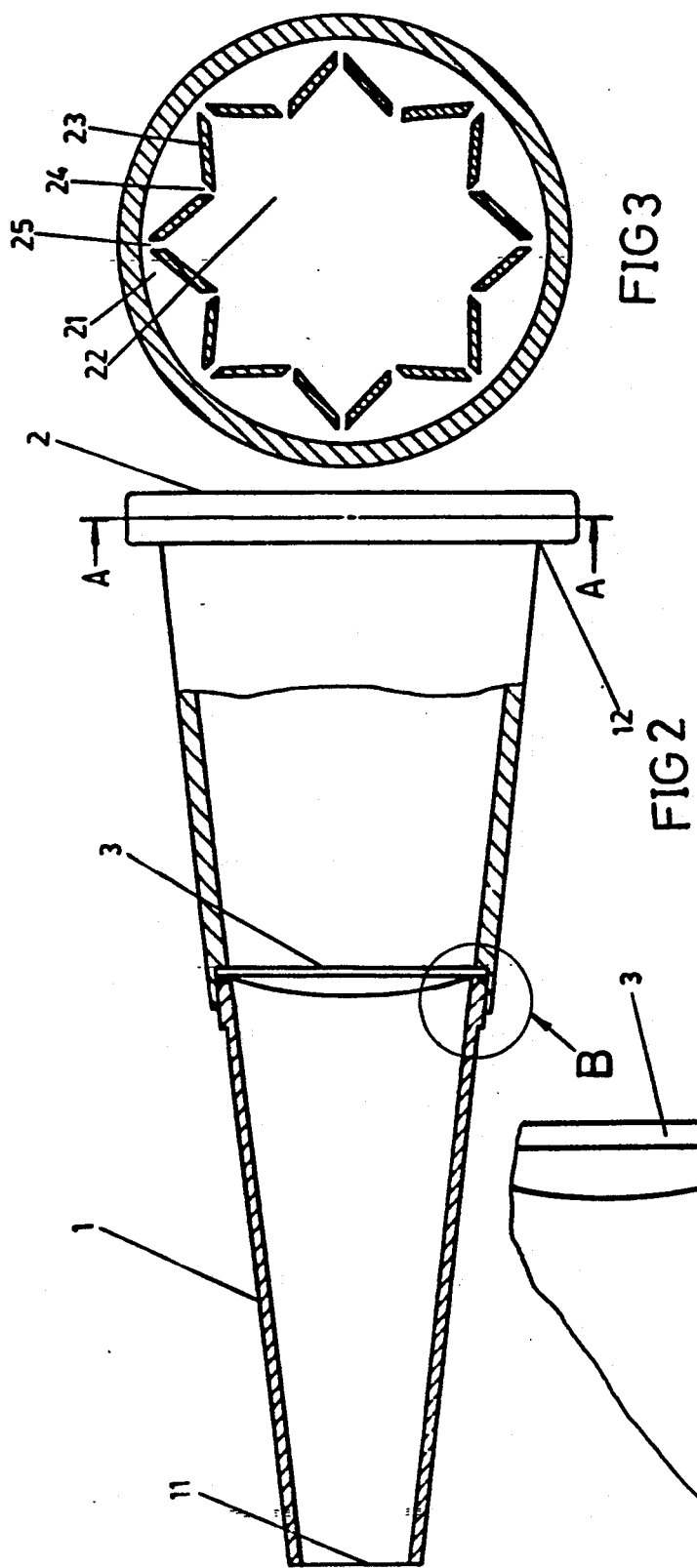

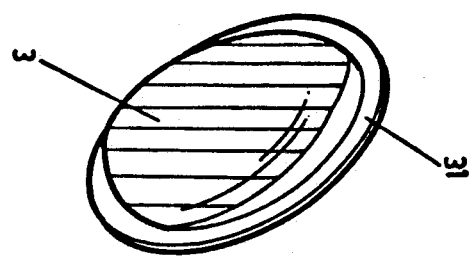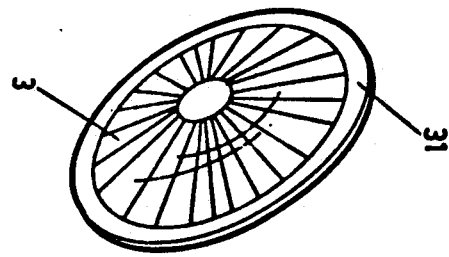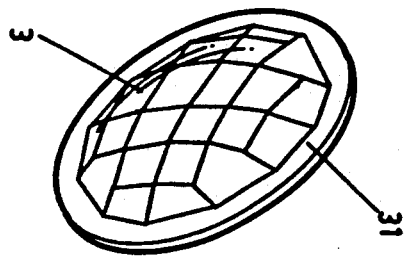
FIG 5

IMPROVED KALEIDOSCOPE STRUCTURE

BACKGROUND OF THE INVENTION

1. Field of the Invention

This invention relates to the field of kaleidoscopes, and in particular to a kaleidoscope in which patterns are produced using fluids.

2. Description of the Prior Art

A conventional kaleidoscope is a short cylindrical tube which comprises a prism and fragmentary pieces of colored objects such as paper. While the tube is turned, images of symmetrical patterns appear in the prism. With this kind of kaleidoscope, a peephole is provided at one end, and a light admitting area is provided at the other end to create the kaleidoscope effect. There is another known type of kaleidoscope where colored oily fluid is substituted for the fragmented pieces of paper, but these types generally produce fewer mutations.

SUMMARY OF THE INVENTION

The structure of the kaleidoscope according to the present invention departs from conventional ones, and as a result, the invention produces more abundant pattern forms. Moreover, the innovated structure results in increased production value as well as practicability.

This invention is mainly concerned with an improvement over a conventional driblet (falling drop) type kaleidoscope, enabling it to provide more visual kaleidoscopic entertainment. The principle components of its structure include a housing in which is mounted a driblet device for forming basic patterns of colored fluid in streams or driblets, and a prism which focuses on these basic patterns and enables images of irregular, changing patterns to be transmitted through the multi-angled prism and appear as more diverse patterns in various aspects.

This invention is related to the structure of a new type of kaleidoscope comprising a hollow tubular housing, a multi-angled prism which is retained crosswise in the middle of the housing, and a disk-shaped driblet device connected to the end of the tubular housing. The driblet device is a closed, disk-shaped hollow body which contains colored fluid that can flow freely. At the inner peripheral edge of the disk, a fluid reservoir and drip nozzle arrangement is provided. When using, fluid will flow from the reservoir near the upper edge of the disk and drip out through the drip nozzle arrangement, automatically passing through center area of the disk, back through an inlet nozzle arrangement, and then to the reservoir near the lower edge of the disk. Diverse patterns that are formed when the fluid is flowing through the center part of the disk are converted into amusing image effects by the multi-angled prism and can be seen from the viewing window at the end of the hollow tubular housing. The multi-angled prism thus further diversifies the changing patterns. Just like the effect of a conventional kaleidoscope, unique patterns are formed.

BRIEF DESCRIPTION OF THE DRAWING

FIG. 1 is an overall 3-Dimensional drawing of the invention.

FIG. 2 is a partial sectional view of the invention.

FIG. 3 is a sectional view shown at A—A in FIG. 2.

FIG. 4 is an enlarged sectional view of the segment shown by arrow B in FIG. 2.

FIG. 5 shows three different 3-Dimensional embodiments of the multi-angled prism of the invention.

DESCRIPTION OF THE PREFERRED EMBODIMENT

Figure 6:
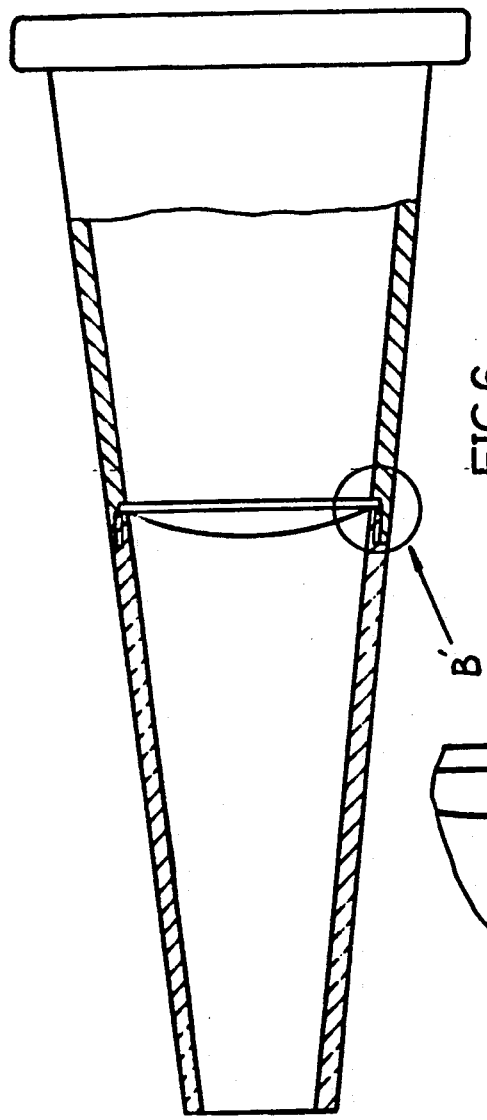
FIG. 6 is a partial sectional view of an alternate means of assembling the invention.

The structure of the invention as shown in FIG. 1 and FIG. 2 mainly comprises conical hollow tubular housing disk-shaped driblet, 2 and multi-angled prism 3.

There is no limitation to the selection of an appropriate material for making the hollow tubular housing. It can be made of acrylics with transparency ranging from completely clear to nontransparency. Further, no limitation is to be imposed on its shape. It can be either cylindrical or conical.

At the head of the tubular housing is a view window 11, open for viewing by the user's eye. At the tail 12 of the tubular housing, the disk driblet device 2 is mounted.

The driblet device 2 is shown as a hollow circulate disk, and the disk terminates the tubular housing 1 at the tail end 12. The disk can be of single or multi-layer design, i.e. one or more disks can be provided, the hollow portion of each containing flowable colored fluids.

As shown in the sectional view drawing of FIG. 3, the circulate edge has a reservoir area 21 which is separated from the central portion 22 by a discontinuous partition 23 where several drip nozzles 24 in the partitions provide communication between reservoir area 21, central portion 22, and flow inlet 25.

The partition 23 is gear shaped where drip nozzles 24 are located toward the center and inlets 25 are located toward the periphery. Drip nozzles 24 permit fluid to flow from the reservoir 21 to the center portion 22, but because of the sloped segments of the partition 23, restrict flow from the center portion 22 to the reservoir 21.

Thus, due to the sloped partition segments, when the disk driblet device 2 is in a vertical position, the colored fluid inside reservoir 21 can flow from the drip nozzles 24 on the edge of reservoir area 21, pass through the central portion 22, flow down to the circulate partition 23, and continuously flow through inlets 25 into lower reservoir 21. When the disk 2 is turned, fluid flows continuously at the central area. This is due to the design of the partitions 23, e.g. the slope, the size of the openings of the drip nozzles 24 and inlets 25, the distances between nozzles, and distances between inlet and disk outer rim etc., all of which can be determined by test.

The main purpose of this design is to make the colored fluid flow through nozzles 24 in sequence, pass through central area 22, develop patterns in central portion 22, and return back into the reservoir. When the disk driblet device is single layer, the thickness can be less. If it is double layer, a third color can be developed by the combining of different colors in the two layers, thereby making the pattern in the central area more diversified.

The main reason for developing patterns in the central portion 22 of the disk is to enable the multi-angled prism 3 to reflect the images in multiple ways, such that diversified patterns can be viewed from the viewing window 11 similar to that of a kaleidoscope.

This multi-angled prism 3 can be retained in place in the middle of the tubular housing 1, as seen in FIG. 4, to divide it into inner and outer tubular sections. When the inner tubular section is inserted, the outer tubular section can be held in place by the rough surface of the extruded rim 14 to fix the two sections as an integral body. It can be disassembled and reassembled many times.

Figure 7:
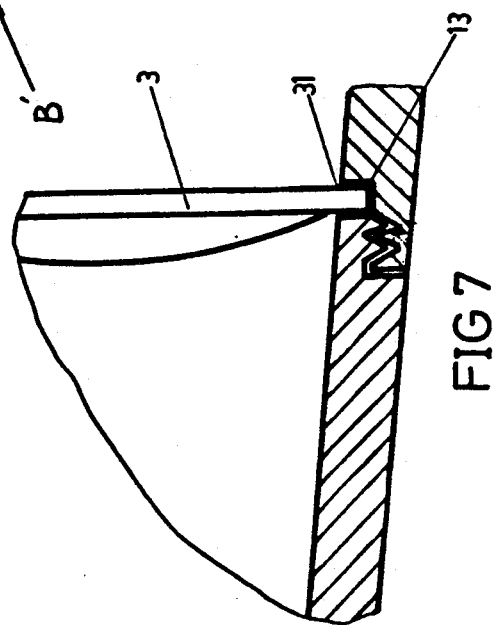
FIG. 7 is an enlarged sectional view of the segment shown by arrow B in FIG. 6.

FIG. 6 and FIG. 7 show the use of a thread tightening assembly to achieve the same purpose. There is a fixture space 13 in the junction area for holding flange 31 of the prism 3 to retain the prism 3 in the tubular housing 1 in a cross-sectional position and parallel with the disk driblet device 2. The prism is placed where it can reflect the image of the layers, and magnificent patterns which are developed by the colored fluid in the central part 22 of the disk driblet device 2 are displayed.

Furthermore, there are many alternate arrangements for prism layout, as shown in FIG. 5. It can have surfaces to radiate images in many directions or in parallel paths, etc., and the reflected image is likewise varied. In any case, once the proper distance to the pattern creating device is decided, diverse patterns can always be seen.

The kaleidoscope of this invention can be used the same as a conventional one by holding it still or rotating it in a turning motion. In the latter case, the dripping condition is always dynamic; i.e., the starting pattern is already irregular, and with turning the prism 3 and viewing through the peephole 11, diversified patterns are visible not unlike a kaleidoscope. However, it is to be understood that there is no limitation, as there is with a conventional kaleidoscope, that the improved kaleidoscope of this invention must be aimed at a light source, because this invention can have a wholly transparent body.

I claim:

1. A structure for a kaleidoscope, comprising:
a hollow tubular housing having a viewing end and an end opposite said viewing end;
a disk-shaped pattern creating device for producing changing patterns at least in the center portion thereof, said pattern creating device located at said opposite end of said housing; and
a multi-angled prism positioned between said viewing end and said pattern creating device;
thereby creating, at said viewing end, a multi-imaged view of the patterns created by said pattern creating device.

2. The structure according to claim 1 wherein:
said tubular housing includes means for retaining said multi-angled prism in place; and
said multi-angled prism has a circular outer ring with a protuberant edge to be retained inside said housing by said retaining means.

3. The structure according to claim 1 wherein the disk-shaped pattern creating device is in the form of a closed hollow disk having an interior divided into inner and outer regions by a generally circulate partition, said partition having openings therein to permit fluid to flow therethrough from the top of said outer region, through said partition and into said inner region, and to flow from said inner region, through said partition and into the bottom of said outer region.

4. The structure according to claim 3, wherein said partition comprises:
means defining a plurality of nozzles, directed inwardly, for channeling fluid from said outer region into said inner region and for restricting fluid from flowing from said inner region into said outer region; and
means defining a plurality of inlets, directed outwardly, for channeling fluid from said inner region into said outer region and for restricting fluid from flowing from said outer region into said inner region.

5. The structure of claim 1, wherein said multi-angled prism has multi-angled facets.

6. The structure of claim 1, wherein said multi-angled prism has radially directed facets.

7. The structure of claim 1, wherein said multi-angled prism has parallel facets.

8. The structure of claim 1, wherein:
said housing comprises first and second coupled sections, and means for coupling the two sections together; and
said multi-angled prism is held in place at the location of said means for coupling.

9. A structure for a kaleidoscope, comprising:
a hollow tubular housing having a viewing end and an end opposite said viewing end;
a disk-shaped pattern creating device for producing changing patterns at least in the center portion thereof, said pattern creating device located at said opposite end of said housing, and including a closed hollow disk having an interior divided into inner and outer regions by a generally circulate partition, said partition having openings therein to permit fluid to flow therethrough from the top of said outer region, through said partition and into said inner region, and to flow from said inner region, through said partition and into the bottom of said outer region; and
a multi-angled prism positioned between said viewing end and said pattern creating device;
thereby creating, at said viewing end, a multi-imaged view of the patterns created by said pattern creating device.

* * * * *